(12) United States Patent
Madigan et al.

(10) Patent No.: US 7,596,452 B2
(45) Date of Patent: Sep. 29, 2009

(54) COMPENSATED CALIPER USING COMBINED ACOUSTIC AND DENSITY MEASUREMENTS

(75) Inventors: William Madigan, Houston, TX (US); Eric B. Molz, Houston, TX (US); Gamal A. Hassan, Houston, TX (US); Philip L. Kurkoski, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 11/770,209

(22) Filed: Aug. 10, 2007

(65) Prior Publication Data

US 2009/0043509 A1    Feb. 12, 2009

(51) Int. Cl.
*G01V 1/40* (2006.01)
(52) U.S. Cl. .............. 702/8; 166/254.2; 702/6
(58) Field of Classification Search ............ 702/6, 702/8; 73/152.02, 152.03; 166/254.2; 250/268, 250/269.3; 175/38, 48; 367/81
See application file for complete search history.

(56) References Cited

U.S. PATENT DOCUMENTS

| | | | |
|---|---|---|---|
| 3,200,822 A | 8/1965 | Meyer | 131/243 |
| 3,321,625 A | 5/1967 | Wahl | 250/71.5 |
| 3,846,631 A | 11/1974 | Kehler | 250/269 |
| 3,858,037 A | 12/1974 | Moore et al. | 235/193 |
| 3,864,569 A | 2/1975 | Tittman | 250/264 |
| 4,628,202 A | 12/1986 | Minette | 250/269 |
| 5,006,845 A | 4/1991 | Calcar et al. | |
| 5,397,893 A | 3/1995 | Minette | 250/254 |
| 5,513,528 A | 5/1996 | Holenka et al. | 73/151 |
| 5,841,135 A | 11/1998 | Stoller et al. | 250/269.3 |
| 6,044,326 A | 3/2000 | Huiszoon | |
| 6,307,199 B1 | 10/2001 | Edwards et al. | 250/269.3 |
| 6,522,334 B2 | 2/2003 | Schauser | 345/503 |
| 6,584,837 B2 | 7/2003 | Kurkoski | 73/152.02 |
| 6,662,884 B2 | 12/2003 | Hemphill | |
| 2004/0168827 A1 | 9/2004 | Jeffryes | |
| 2006/0113110 A1 | 6/2006 | Leuchtenberg | |
| 2006/0207795 A1 | 9/2006 | Kinder et al. | |
| 2007/0005251 A1* | 1/2007 | Chemali et al. | 702/6 |
| 2007/0144740 A1* | 6/2007 | Guo et al. | 166/254.2 |

* cited by examiner

*Primary Examiner*—John H Le
(74) *Attorney, Agent, or Firm*—Madan & Sriram, P.C.

(57) ABSTRACT

A logging-while-drilling density sensor includes a gamma ray source and at least two NaI detectors spaced apart from the source for determining measurements indicative of the formation density. An analytic function based on a heuristic model is used to predict the measured response as a function of offset, mud density and formation density. The model may be used to provide a caliper measurement where acoustic caliper data are unreliable.

23 Claims, 9 Drawing Sheets

COMPENSATED CALIPER USING COMBINED ACOUSTIC AND DENSITY MEASUREMENTS

BACKGROUND OF THE DISCLOSURE

1. Field of the Disclosure

This disclosure relates generally to borehole logging apparatus and methods for performing nuclear radiation based measurements. More particularly, this disclosure relates to a new and improved apparatus for effecting formation density logging and caliper measurements in real time using gamma rays in a measurement-while-drilling (MWD) tool.

2. Background of the Art

Oil well logging has been known for many years and provides an oil and gas well driller with information about the particular earth formation being drilled. In conventional oil well logging, after a well has been drilled, a probe known as a sonde is lowered into the borehole and used to determine some characteristic of the formations which the well has traversed. The probe is typically a hermetically sealed steel cylinder which hangs at the end of a long cable which gives mechanical support to the sonde and provides power to the instrumentation inside the sonde. The cable also provides communication channels for sending information up to the surface. It thus becomes possible to measure some parameter of the earth's formations as a function of depth, that is, while the sonde is being pulled uphole. Such "wireline" measurements are normally done in real time (however, these measurements are taken long after the actual drilling has taken place).

A wireline sonde usually transmits energy into the formation as well as a suitable receiver for detecting the same energy returning from the formation. These could include resistivity, acoustic, or nuclear measurements. The present disclosure is discussed with reference to a density measurement tool that emits nuclear energy, and more particularly gamma rays, but the method of the present disclosure is applicable to other types of logging instruments as well. Wireline gamma ray density probes are well known and comprise devices incorporating a gamma ray source and a gamma ray detector, shielded from each other to prevent counting of radiation emitted directly from the source. During operation of the probe, gamma rays (or photons) emitted from the source enter the formation to be studied, and interact with the atomic electrons of the material of the formation by photoelectric absorption, by Compton scattering, or by pair production. In photoelectric absorption and pair production phenomena, the particular photons involved in the interacting are removed from the gamma ray beam.

In the Compton scattering process, the involved photon loses some of its energy while changing its original direction of travel, the loss being a function of the scattering angle. Some of the photons emitted from the source into the sample are accordingly scattered toward the detector. Many of these never reach the detector, since their direction is changed by a second Compton scattering, or they are absorbed by the photoelectric absorption process of the pair production process. The scattered photons that reach the detector and interact with it are counted by the electronic equipment associated with the detector.

Examples of prior art wireline density devices are disclosed in U.S. Pat. Nos. 3,202,822; 3,321,625; 3,846,631; 3,858,037; 3,864,569 and 4,628,202. Wireline formation evaluation tools such as the aforementioned gamma ray density tools have many drawbacks and disadvantages including loss of drilling time, the expense and delay involved in tripping the drillstring so as to enable the wireline to be lowered into the borehole and both the build up of a substantial mud cake and invasion of the formation by the drilling fluids during the time period between drilling and taking measurements. An improvement over these prior art techniques is the art of measurement-while-drilling (MWD) in which many of the characteristics of the formation are determined substantially contemporaneously with the drilling of the borehole.

Measurement-while-drilling logging either partly or totally eliminates the necessity of interrupting the drilling operation to remove the drillstring from the hole in order to make the necessary measurements by wireline techniques. In addition to the ability to log the characteristics of the formation through which the drill bit is passing, this information on a real time basis provides substantial safety advantages for the drilling operation.

One potential problem with MWD logging tools is that the measurements are typically made while the tool is rotating. Since the measurements are made shortly after the drillbit has drilled the borehole, washouts are less of a problem than in wireline logging. Nevertheless, there can be some variations in the spacing between the logging tool and the borehole wall ("standoff") with azimuth. Nuclear measurements are particularly degraded by large standoffs due to the scattering produced by borehole fluids between the tool and the formation.

Figure 2:
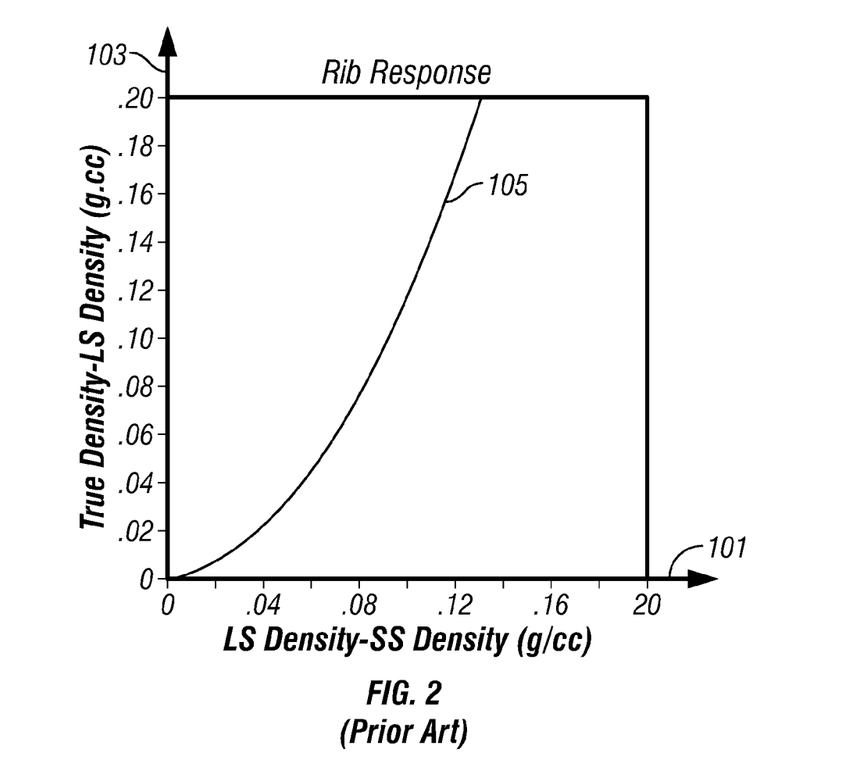
FIG. 2 (Prior Art) shows an example of how density measurements made from a long spaced and a short spaced tool are combined to give a corrected density.

U.S. Pat. No. 5,397,893 to Minette, the contents of which are fully incorporated herein be reference, teaches a method for analyzing data from a measurement-while-drilling (MWD) formation evaluation logging tool which compensates for rotation of the logging tool (along with the rest of the drillstring) during measurement periods. The density measurement is combined with the measurement from a borehole caliper, such as an acoustic caliper. The acoustic caliper continuously measures the standoff as the tool is rotating around the borehole. If the caliper is aligned with the density source and detectors, this gives a determination of the standoff in front of the detectors at any given time. This information is used to separate the density data into a number of bins based on the amount of standoff. After a pre-set time interval, the density measurement can then be made. The first step in this process is for short space (SS) and long space (LS) densities to be calculated from the data in each bin. Then, these density measurements are combined in a manner that minimizes the total error in the density calculation. This correction is applied using the "spine and rib" algorithm and graphs such as that shown in FIG. 2. In the figure, the abscissa 101 is the difference between the LS and SS densities while the ordinate 103 is the correction that is applied to the LS density to give a corrected density using the curve 105.

Figure 3:
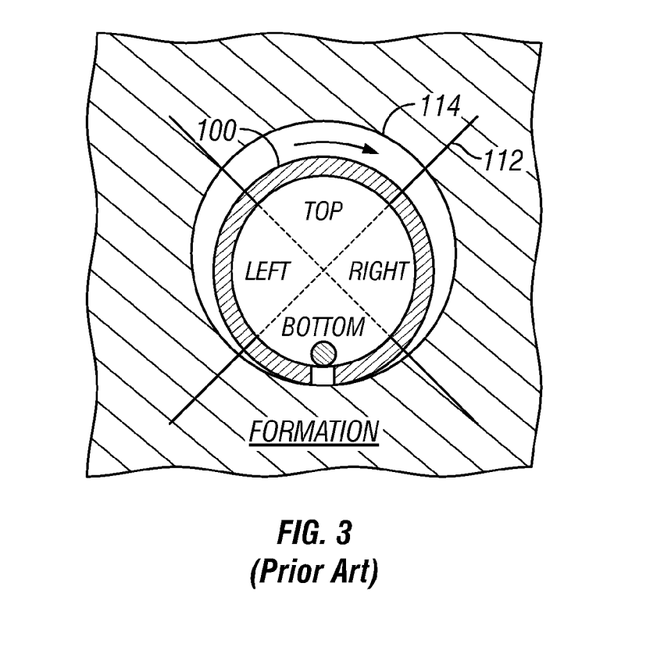
FIG. 3 (Prior art) shows an idealized situation in which a rotating tool in a wellbore has a minimum standoff when the tool is at the bottom of the wellbore.

There are many patents that have addressed the problem of density measurements made with rotating drillstring. See, for example, Holenka et al, (U.S. Pat. No. 5,513,528) and Edwards (U.S. Pat. No. 6,307,199). Referring to FIG. 3, an assumption is made that the down vector defines a situation in which the standoff is at a minimum, allowing for a good spine and rib correction. See also U.S. Pat. No. 6,522,334 to Ellis et al., U.S. Pat. No. 5,841,135 to Stoller et al.

U.S. Pat. No. 6,584,837 to Kurkoski and having the same assignee as the present application addressed the problem of varying standoff by using caliper measurements to measure the standoff. Using the caliper measurements and orientation measurements, spatial bins covering both azimuth and offset are defined. Within each azimuthal sector, a weighted average of the density values gives an azimuthal density measurement that is superior to earlier methods. The method of Kurkoski requires the use of a caliper. In addition, measurements may need to be averaged over many tool rotations to provide meaningful statistics for measurements within each spatial bin. This may result in decreased vertical resolution.

A problem with acoustic caliper measurements is the limited range—in boreholes with large washouts, the acoustic caliper is unreliable. Another problem is that the spine- and rib correction is not only dependent upon the standoff but also on the formation and mud densities. The present disclosure addresses these issues.

SUMMARY OF THE DISCLOSURE

One embodiment of the disclosure is a method of evaluating an earth formation. The method includes irradiating the earth formation with a source of radiation on a tool within a borehole and making measurements at least two spaced apart detectors responsive to gamma rays resulting from the irradiating. A heuristic model is defined that includes three density parameters: a formation density, a standoff of the tool, and a density of a mud in the borehole. The method further includes using the measurements and the heuristic model to estimate values of two of the three density parameters corresponding to a specific value of the third of the density parameters, and recording the estimated values of the two parameters on a suitable medium. Irradiating the earth formation may be done using a gamma ray source. Defining the heuristic model may be done by fitting results of a Monte Carlo simulation to a model including path lengths from the source to each of the at least two detectors, a scattering parameter in the mud, a scattering parameter in the formation, and a partitioning parameter. The Monte Carlo simulations may be done for different values of formation density, mud weight, and standoff. The third parameter may be a standoff of the tool measured at the first location using a caliper and the method may further include using the estimated mud density and an estimated formation density at a second location to estimate a standoff at the second location. The method may also further include producing a log of tool standoff at locations without using a caliper measurement. The third parameter may be the tool standoff measured at one location using a caliper and the method may further include using the estimated mud density, a caliper location at another location, and a measurement at one of the at least two detectors to estimate a formation density at the other location. Three detectors may be used, in which case the method may include determining the three density parameters simultaneously.

Another embodiment of the disclosure is an apparatus for evaluating an earth formation. The apparatus includes a source of radiation on a tool configured to irradiate the earth formation from within a borehole, and at least two spaced apart detectors configured to provide measurements indicative of gamma rays resulting from the irradiating. The apparatus also includes a processor which is configured to define a heuristic model that includes three density parameters, namely, a formation density, a standoff of the tool, and a density of mud in the borehole. The processor is further configured to use the measurements and the heuristic model to estimate values of two of the three density parameters corresponding to a specific value of the third of the density parameters, and record the estimated value of the two parameters on a suitable medium. The radiation source may be a gamma ray source. The processor may be further configured to define the heuristic model by fitting results of a Monte Carlo simulation to a model including a path length from the source to each of the at least two detectors, a scattering parameter in the mud, a scattering parameter in the formation, and a partitioning parameter. The processor may be configured to perform the Monte Carlo simulation for different values of formation density, mud weight, and standoff. The third parameter may be a standoff of the tool measured at one location using a caliper, and the processor may be further configured to use the estimated mud density and an estimated formation density at another location to estimate a standoff at the other location. The processor may be further configured to produce a log of tool standoff at other locations without using a caliper measurement. The third parameter may be a standoff of the tool measured at one location using a caliper, and the processor may be further configured to use the estimated mud density, a caliper measurement at another location, and the measurement at one of the two detectors to estimate a density at the other location. The at least two detectors may include three detectors and the processor may be configured to determine all three density parameters simultaneously. The tool may be part of a logging string conveyed on a wireline or it may be part of a bottomhole assembly conveyed on a drilling tubular.

Another embodiment of the disclosure is a computer-readable medium for use with an apparatus for evaluating an earth formation. The apparatus includes a source of radiation on a tool configured to irradiate the earth formation from within a borehole, and at least two spaced apart detectors configured to provide measurements indicative of gamma rays resulting from the irradiating. The medium includes instructions which enable a processor to define a heuristic model that includes three density parameters, namely, a formation density, a standoff of the tool, and a density of a mud in the borehole. The instructions further enable a processor to use the measurements and the heuristic model to estimate values of two of the three density parameters corresponding to a specific value of the third of the three density parameters, and record the estimated value of the two parameters on a suitable medium. The medium may include a ROM, an EAROM, an EPROM, an EEPROM, a flash memory, and/or an optical disk.

BRIEF DESCRIPTION OF THE FIGURES

For detailed understanding of the present disclosure, references should be made to the following detailed description of the disclosure, taken in conjunction with the accompanying drawings, in which like elements have been given like numerals and wherein.

DETAILED DESCRIPTION OF THE DISCLOSURE

Figure 1:
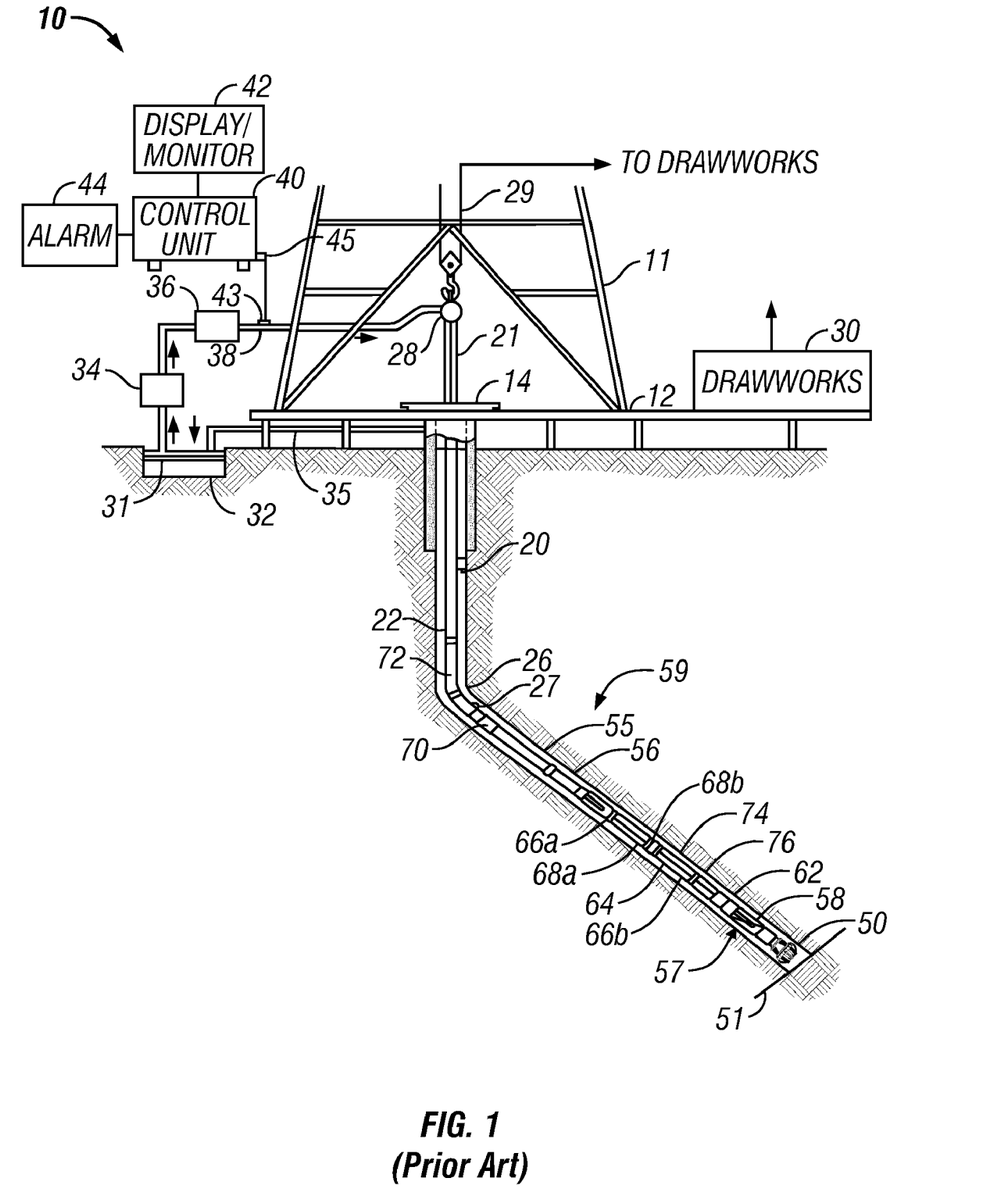
FIG. 1 (Prior Art) illustrates a measurement-while-drilling (MWD) logging device that is suitable for use with the present disclosure.

FIG. 1 shows a schematic diagram of a drilling system 10 having a downhole assembly containing an acoustic sensor system and the surface devices according to one embodiment of present disclosure. As shown, the system 10 includes a conventional derrick 11 erected on a derrick floor 12 which supports a rotary table 14 that is rotated by a prime mover (not shown) at a desired rotational speed. A drill string 20 that includes a drill pipe section 22 extends downward from the rotary table 14 into a borehole 26. A drill bit 50 attached to the drill string downhole end disintegrates the geological formations when it is rotated. The drill string 20 is coupled to a drawworks 30 via a kelly joint 21, swivel 28 and line 29 through a system of pulleys 27. During the drilling operations, the drawworks 30 is operated to control the weight on bit and the rate of penetration of the drill string 20 into the borehole 26. The operation of the drawworks 30 is well known in the art and is thus not described in detail herein.

During drilling operations a suitable drilling fluid (commonly referred to in the art as "mud") 31 from a mud pit 32 is circulated under pressure through the drill string 20 by a mud pump 34. The drilling fluid 31 passes from the mud pump 34 into the drill string 20 via a desurger 36, fluid line 38 and the kelly joint 21. The drilling fluid is discharged at the borehole bottom 51 through an opening in the drill bit 50. The drilling fluid circulates uphole through the annular space 27 between the drill string 20 and the borehole 26 and is discharged into the mud pit 32 via a return line 35. A variety of sensors (not shown) may be deployed on the surface according to known methods in the art to provide information about various drilling-related parameters, such as fluid flow rate, weight on bit, hook load, etc.

A surface control unit 40 receives signals from the downhole sensors and devices via a sensor 43 placed in the fluid line 38 and processes such signals according to programmed instructions provided to the surface control unit. The surface control unit displays desired drilling parameters and other information on a display/monitor 42 which information is utilized by an operator to control the drilling operations. The surface control unit 40 contains a computer, memory for storing data, data recorder and other peripherals. The surface control unit 40 also includes models and processes data according to programmed instructions and responds to user commands entered through a suitable means, such as a keyboard. The control unit 40 is may be adapted to activate alarms 44 when certain unsafe or undesirable operating conditions occur.

A drill motor or mud motor 55 coupled to the drill bit 50 via a drive shaft (not shown) disposed in a bearing assembly 57 rotates the drill bit 50 when the drilling fluid 31 is passed through the mud motor 55 under pressure. The bearing assembly 57 supports the radial and axial forces of the drill bit, the downthrust of the drill motor and the reactive upward loading from the applied weight on bit. A stabilizer 58 coupled to the bearing assembly 57 acts as a centralizer for the lowermost portion of the mud motor assembly.

In one embodiment of the system of present disclosure, the downhole subassembly 59 (also referred to as the bottomhole assembly or "BHA") which contains the various sensors and MWD devices to provide information about the formation and downhole drilling parameters and the mud motor, is coupled between the drill bit 50 and the drill pipe 22. The downhole assembly 59 preferably is modular in construction, in that the various devices are interconnected sections so that the individual sections may be replaced when desired.

Still referring back to FIG. 1, the BHA may contains sensors and devices in addition to the above-described sensors. Such devices include a device for measuring the formation resistivity near the drill bit, a gamma ray device for measuring the formation gamma ray intensity and devices for determining the inclination and azimuth of the drill string. The formation resistivity measuring device 64 may be coupled above the lower kick-off subassembly 62 that provides signals, from which resistivity of the formation near or in front of the drill bit 50 is determined. A dual propagation resistivity device ("DPR") having one or more pairs of transmitting antennae 66a and 66b spaced from one or more pairs of receiving antennae 68a and 68b is used. Magnetic dipoles are employed which operate in the medium frequency and lower high frequency spectrum. In operation, the transmitted electromagnetic waves are perturbed as they propagate through the formation surrounding the resistivity device 64. The receiving antennae 68a and 68b detect the perturbed waves. Formation resistivity is derived from the phase and/or amplitude of the detected signals. The detected signals are processed by a downhole circuit that may be placed in a housing 70 above the mud motor 55 and transmitted to the surface control unit 40 using a suitable telemetry system 72. Determination of formation resistivity from amplitude and phase measurements is well known in prior art. U.S. Pat. No. 5,811,973 to Meyer having the same assignee as the present disclosure and the contents of which are fully incorporated herein by reference, further teaches the determination of resistivity of the connate formation fluid, the dielectric constant of the dry rock matrix, and the water filled porosity of the formation. Such determinations may also be made with the present disclosure using the methods taught by Meyer.

The inclinometer 74 and gamma ray device 76 are suitably placed along the resistivity measuring device 64 for respectively determining the inclination of the portion of the drill string near the drill bit 50 and the formation gamma ray intensity. Any suitable inclinometer and gamma ray device, however, may be utilized for the purposes of this disclosure. In addition, an azimuth device (not shown), such as a magnetometer or a gyroscopic device, may be utilized to determine the drill string azimuth. Such devices are known in the art and are, thus, not described in detail herein. In the above-described configuration, the mud motor 55 transfers power to the drill bit 50 via one or more hollow shafts that run through the resistivity measuring device 64. The hollow shaft enables the drilling fluid to pass from the mud motor 55 to the drill bit 50. In an alternate embodiment of the drill string 20, the mud motor 55 may be coupled below resistivity measuring device 64 or at any other suitable place.

The drill string contains a modular sensor assembly, a motor assembly and kick-off subs. In one embodiment, the sensor assembly includes a resistivity device, gamma ray device, and inclinometer. A processor (not shown) is located downhole for processing the data. Due to the large amount of data that are obtained and processed downhole, a memory device having adequate capacity is necessary.

The above-noted devices transmit data to the downhole telemetry system 72, which in turn transmits the received data uphole to the surface control unit 40. The downhole telemetry also receives signals and data from the uphole control unit 40 and transmits such received signals and data to the appropriate downhole devices. The present disclosure may utilize a mud pulse telemetry technique to communicate data from downhole sensors and devices during drilling operations. A transducer 43 placed in the mud supply line 38 detects the mud pulses responsive to the data transmitted by the downhole telemetry 72. Transducer 43 generates electrical signals in response to the mud pressure variations and transmits such signals via a conductor 45 to the surface control unit 40. Other telemetry techniques such electromagnetic and acoustic techniques or any other suitable technique may be utilized for the purposes of this disclosure. The drilling assembly also includes a directional sensor. Without limiting the scope of the disclosure, the directional sensor can be a magnetometer or of the inertial type.

In one embodiment of the disclosure, a drilling sensor module 59 is placed near the drill bit 50. The drilling sensor module contains sensors, circuitry and processing software and algorithms relating to the dynamic drilling parameters. Such parameters may include bit bounce, stick-slip of the drilling assembly, backward rotation, torque, shocks, borehole and annulus pressure, acceleration measurements and other measurements of the drill bit condition. A suitable telemetry or communication sub 72 using, for example, two-way telemetry, is also provided as illustrated in the drilling assembly 90. The drilling sensor module processes the sensor information and transmits it to the surface control unit 40 via the telemetry system 72.

Figure 4:
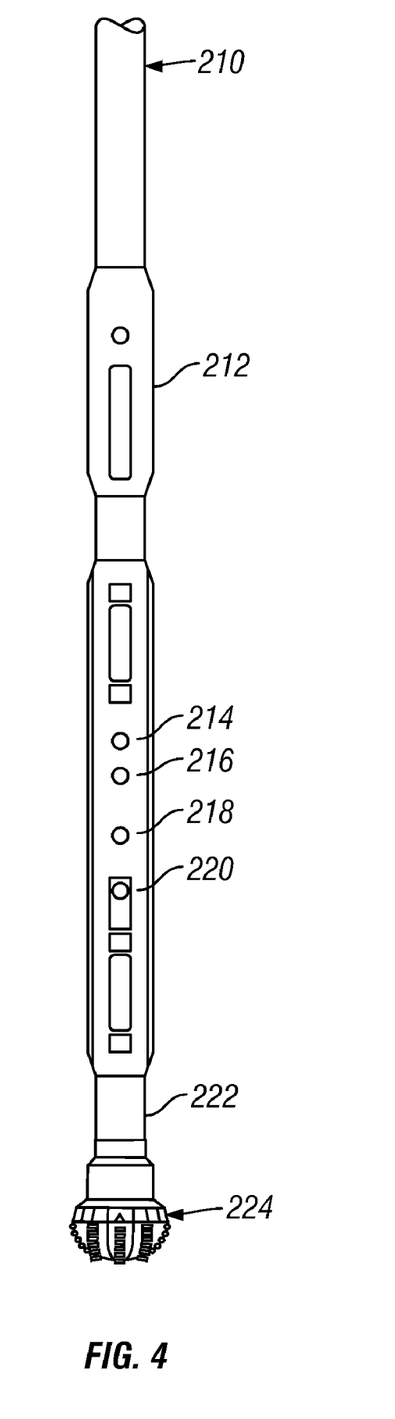
FIG. 4 illustrates the arrangement of the nuclear sensors on a logging-while-drilling device.

Referring now to FIG. 4 a diagram of the basic components for an exemplary gamma-ray density tool. This tool comprises an upper section of a BHA including a drill collar 210. The drilling tubular used for conveying the BHA is well known in the art and is not disclosed here. The logging tool of the present disclosure includes a gamma-ray source 214 and two spaced gamma-ray detector assemblies 216 and 218. All three components are placed along a single axis that has been located parallel to the axis of the tool. The detector 216 closest to the gamma-ray source will be referred to as the "short spaced detector" (SS) and the one farthest away 218 is referred to as the "long spaced detector" (LS). Gamma-ray shielding (not shown) is located between detector assemblies 216, 218 and source 214. Windows (ports) open up to the formation from both the detector assemblies and the source. The optional acoustic caliper (A1) 120 is inline and close to the gamma detectors (LS & SS). A layer of drilling fluid (mud) is present between the formation and the detector assemblies and source. Also shown in FIG. 4 are the lower section of the bottomhole assembly 222 and drill bit 224 and one or more additional sensor assemblies 212.

In order to predict the response of the logging tool, we use a heuristic model. We use the following analytic expression to predict the gamma ray count at a receiver:

$$I = \{ \underline{e^{-\lambda \eta} e^{-\mu(2\rho_m t_m \gamma + \rho t)} \rho e^{\rho \alpha}} + \underline{\underline{(1 - e^{-\lambda \eta}) e^{-\mu(\xi \rho_m t_m + \rho_m t)} \rho_m e^{\rho_m \beta}}} \} I_0. \quad (1)$$

Where I=detector count rate,
$I_0$=source strength,
$\rho$=formation electron density,
$\rho_m$=mud electron density,
t=source—detector distance (cm),
$t_m$=standoff (cm),
$\mu$=mass attenuation coefficient (cm$^2$/g), and
$\eta$=0.5 tm.

It is to be noted that the densities in the fit are equivalent formation electron densities and not actual densities as used in the common meaning of the word. This is due to the fact that the density measurement is a transmission measurement in which the attenuation of the gamma ray flux in the formation is a function of the electron density of the formation and the electron density of the mud. There are five free parameters in the model. $\lambda$ is a partitioning parameter allocating the measured signal to effects of the mud and the formation. The first term within the braces (with the single underlining) is the effect of propagation through the formation and a second term within the braces (with a double underlining) denotes the effect of propagation through the mud. The parameters $\alpha$ and $\beta$ are scattering parameters in the formation and the mud respectively. The parameters $\xi$ and $\gamma$ are effective thickness parameters for the mud in the formation and mud sectors respectively.

Figure 5:
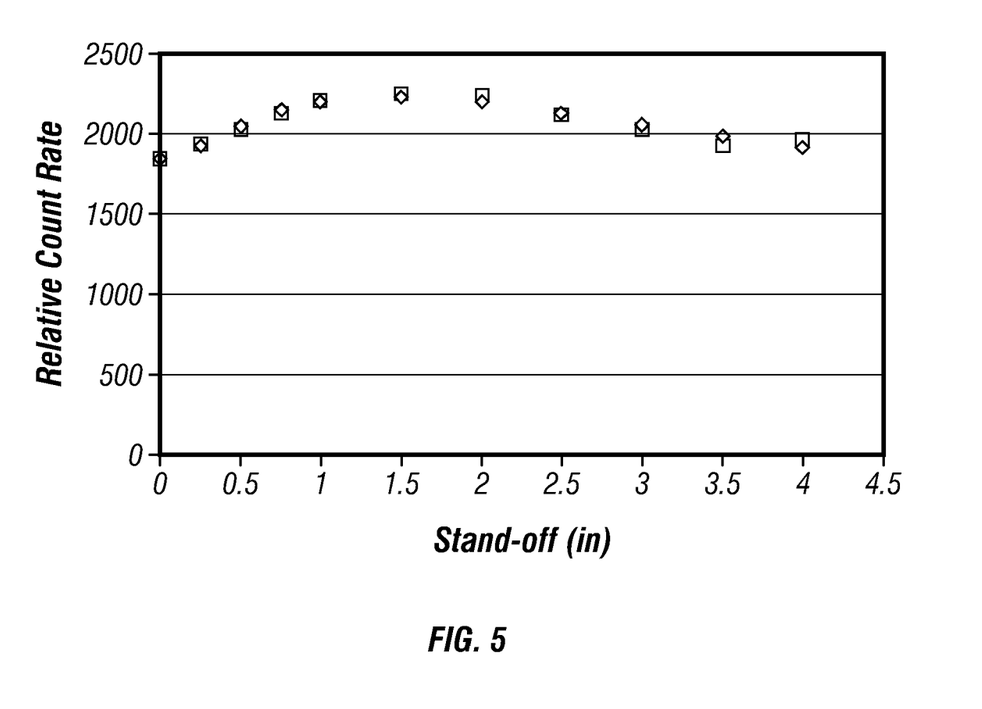
FIG. 5 shows an exemplary comparison of count-rates obtained using the analytic function of the present disclosure with simulated measurements for the near detector.
Figure 6:
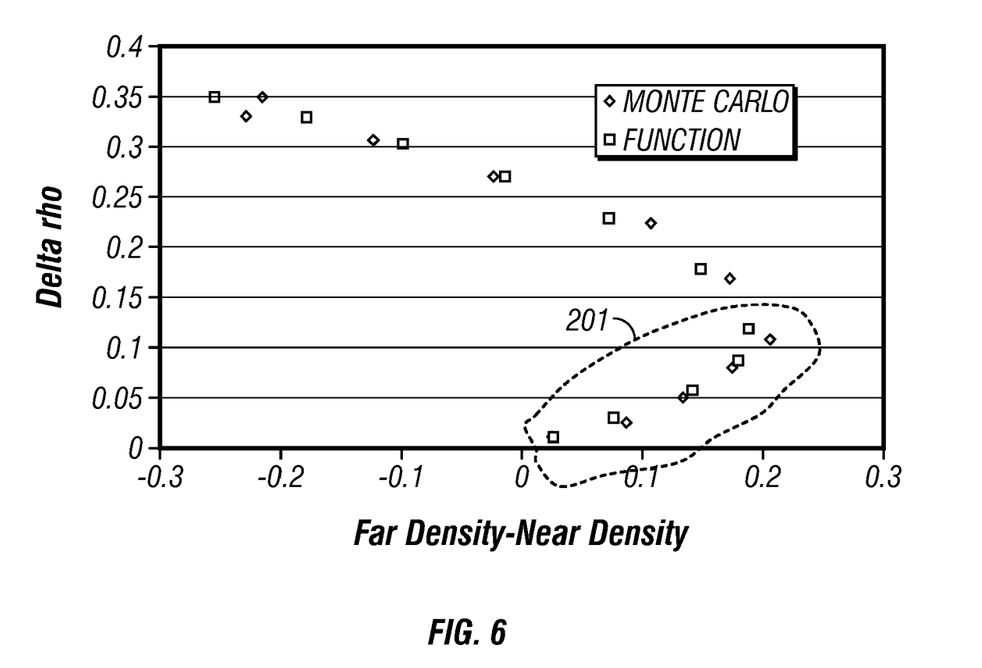
FIG. 6 shows the $\Delta\rho$ values calculated from the analytic function of the present disclosure and Monte Carlo simulation.

A Monte Carlo simulation was carried out to simulate the tool response. Calculations were performed for three formation densities ((30 pu sand, 20 pu lime, and 0 pu dolomite), six mud weights (10, 12, 14, 16, 17, & 18 ppg barite mud), and eleven values of standoff (0.0, 0.25, 0.50, 0.75, 1.0, 1.5, 2.0, 2.5, 3.0, 3.5, 4.0 inches). The values of the parameters giving the best fits in an unconstrained optimization were found to be functions of the mud density and formation/mud density ratio. None of the parameters is a function of standoff. Substituting these mathematical dependences for the parameters yielded a function of formation density, mud density, and standoff. FIG. 5 shows a comparison of the count rates calculated by the analytic function and those calculated by Monte Carlo for the near detector and 30 pu sand and 12 ppg barite mud. The agreement is excellent. This result is typical of those obtained over the full range of mud weights and formation densities. FIG. 6 shows the $\Delta \rho$ values calculated from the function and Monte Carlo. $\Delta \rho$ is the quantity that is added to the far density to yield a corrected density (see ordinate of FIG. 2). It is worth pointing out that in FIG. 2, the range of values roughly corresponds to the portion highlighted by 201 in FIG. 6.

Figure 7:
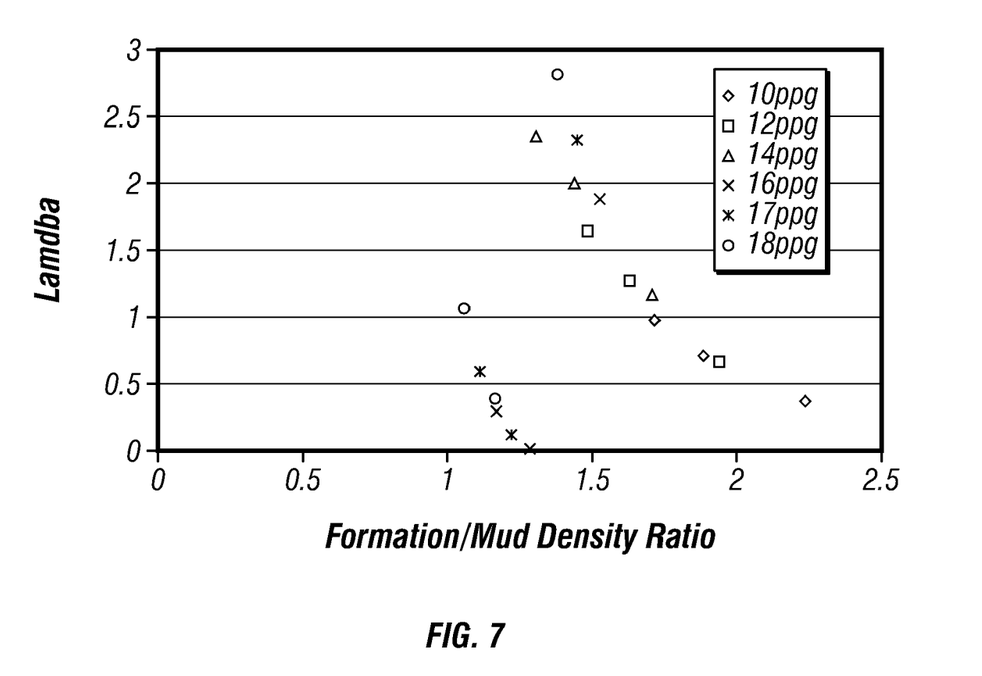
FIG. 7 shows the partitioning parameter $\lambda$ for the near detector as a function of the density ratio of the formation of the mud.
Figure 8:
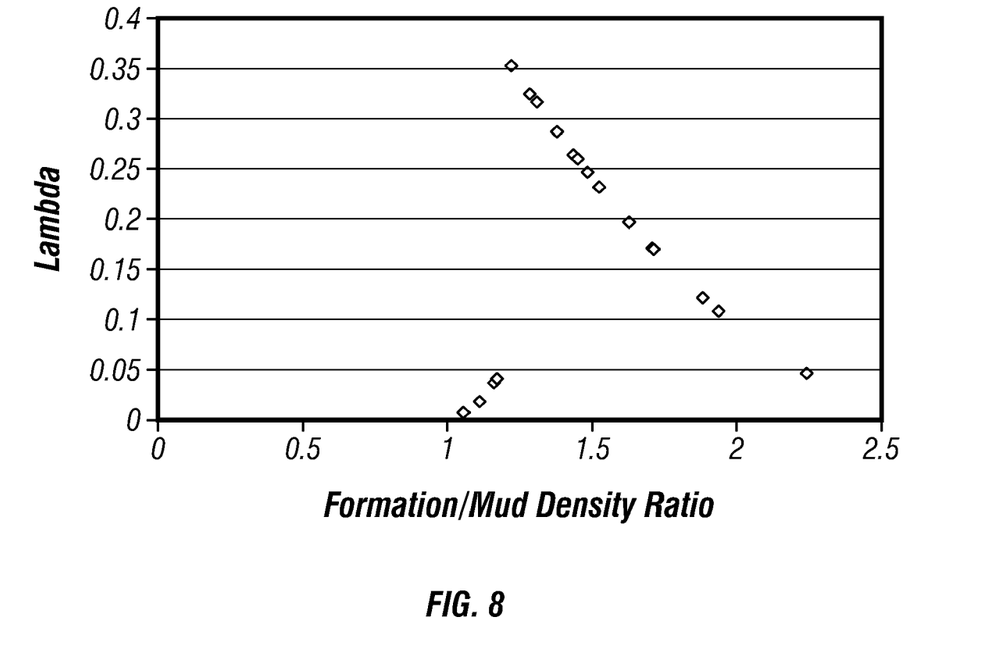
FIG. 8 shows the partitioning parameter $\lambda$ for the far detector as a function of the density ratio of the formation of the mud.
Figure 9:
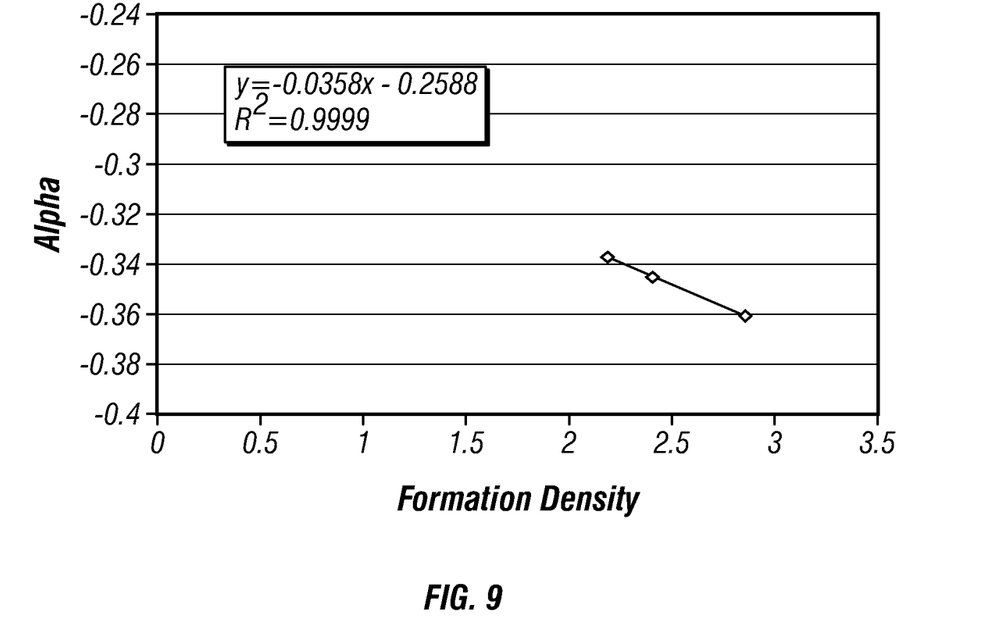
FIG. 9 shows the in-formation scattering parameter α for the near detector as a function of the formation density.
Figure 10:
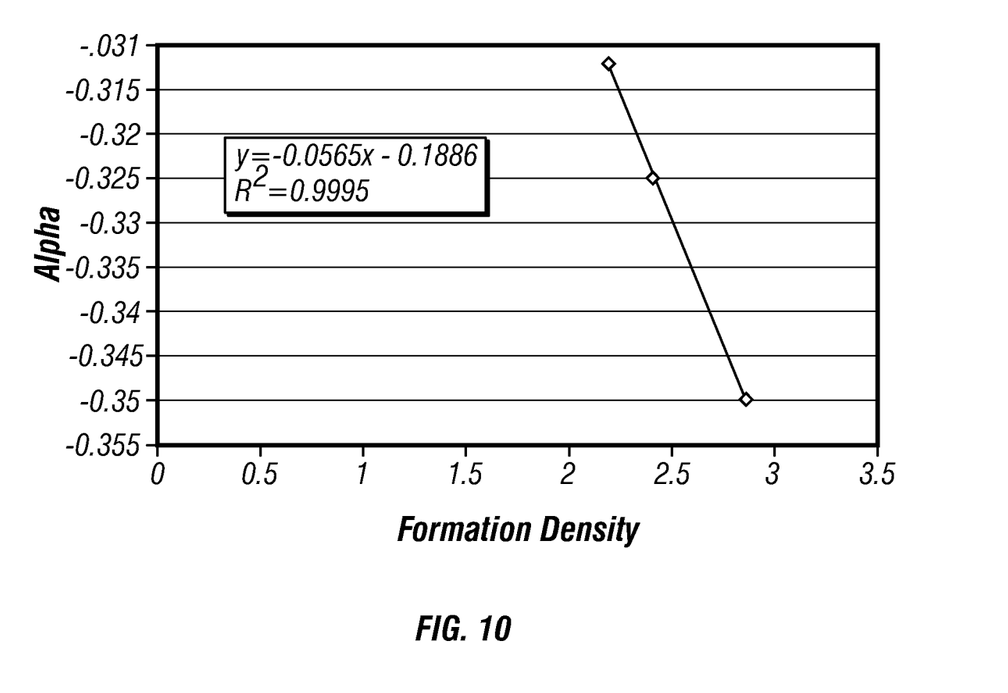
FIG. 10 shows the in-formation scattering parameter α for the far detector as a function of the formation density.
Figure 11:
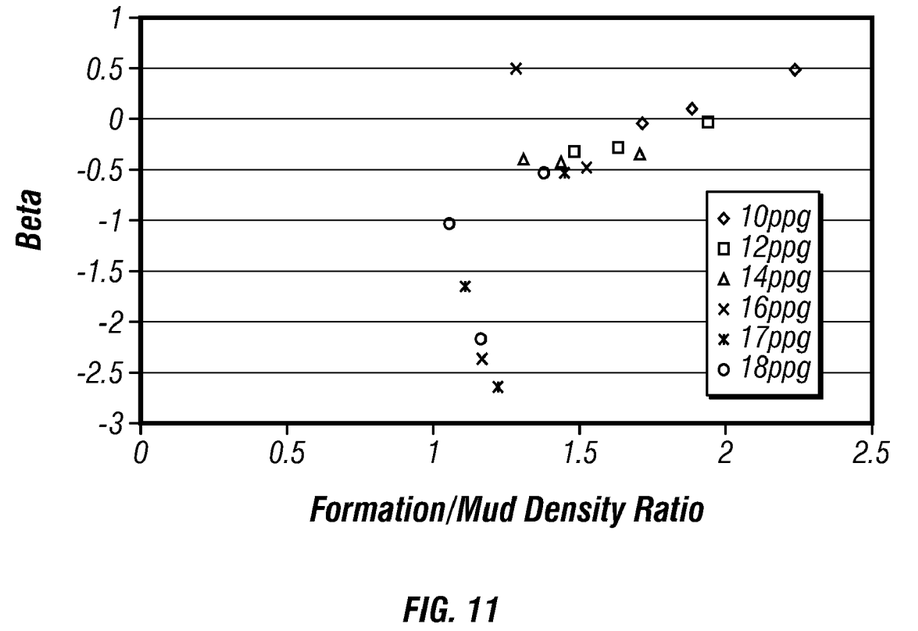
FIG. 11 shows the in-mud scattering parameter β for the near detector as a function of the density ratio of the formation of the mud.
Figure 12:
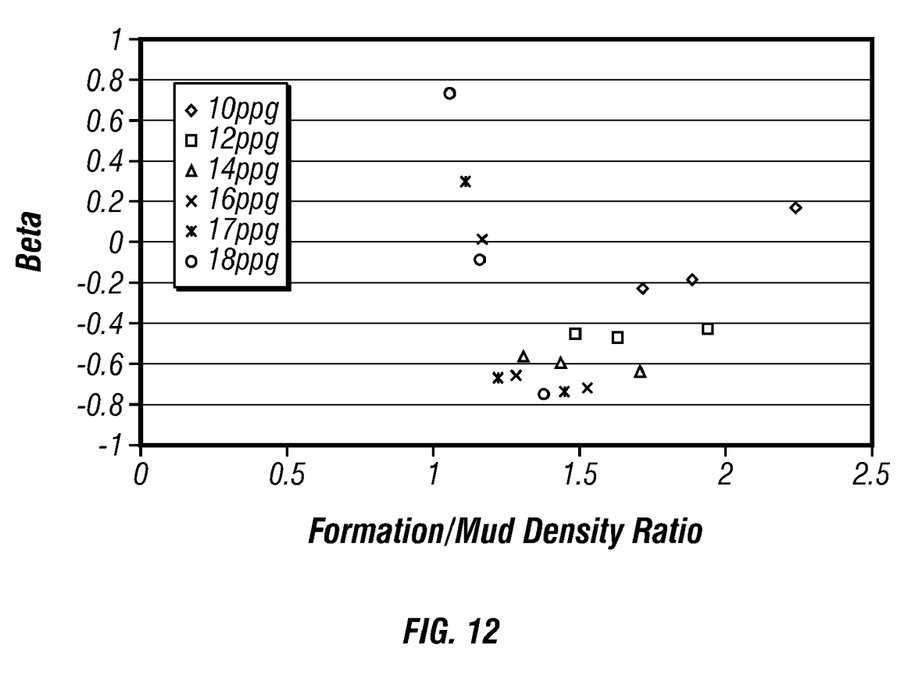
FIG. 12 shows the in-mud scattering parameter β for the far detector as a function of the density ratio of the formation of the mud.
Figure 13:
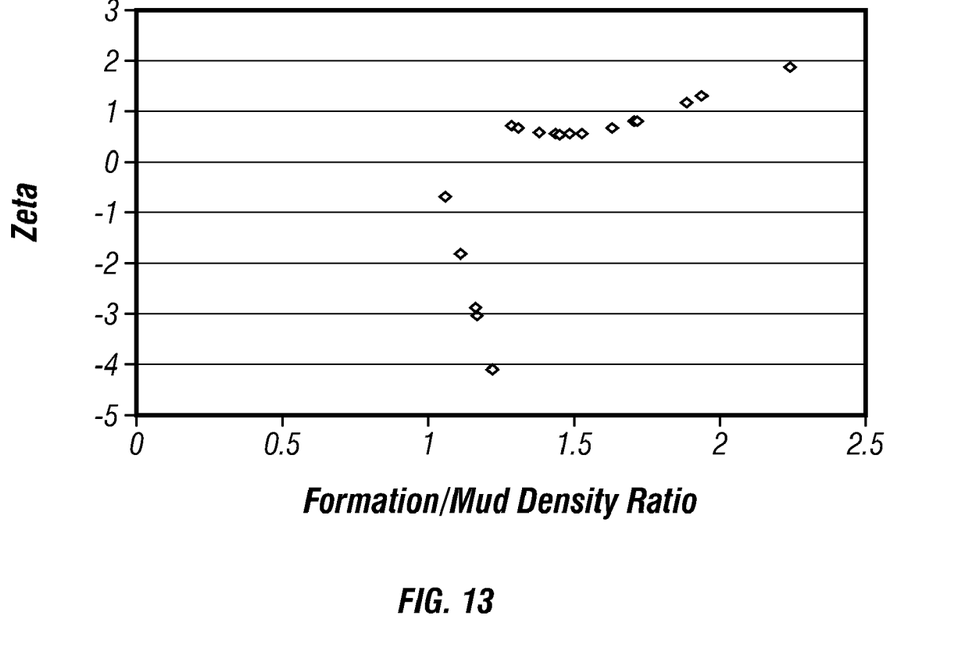
FIG. 13 shows the effective mud thickness parameter (mud sector) ξ for the near detector as a function of the density ratio of the formation and the mud.
Figure 14:
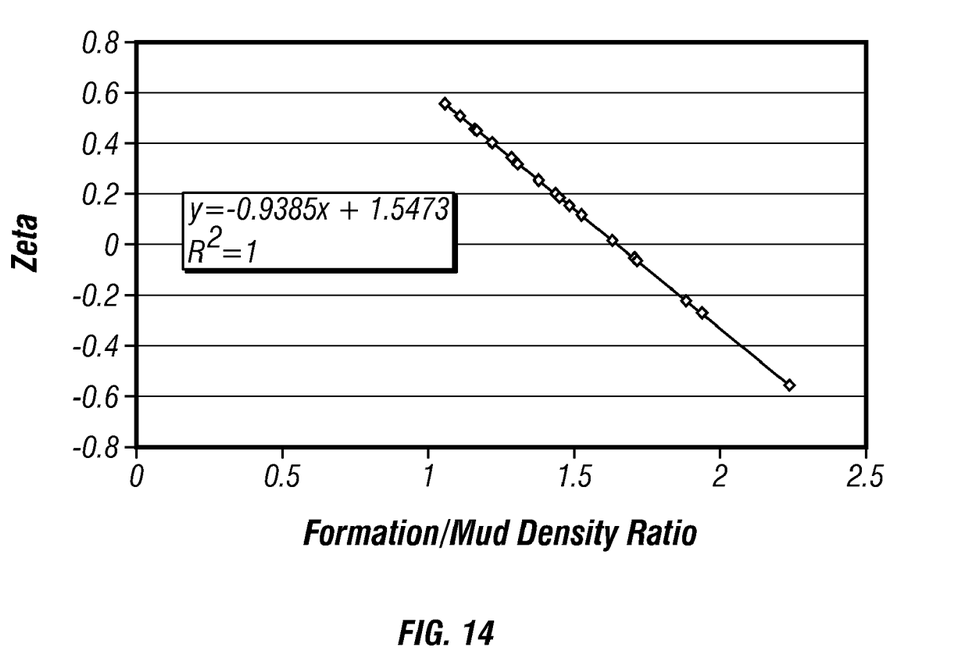
FIG. 14 shows the effective mud thickness parameter (mud sector) ξ for the far detector as a function of the density ratio of the formation and the mud.
Figure 15:
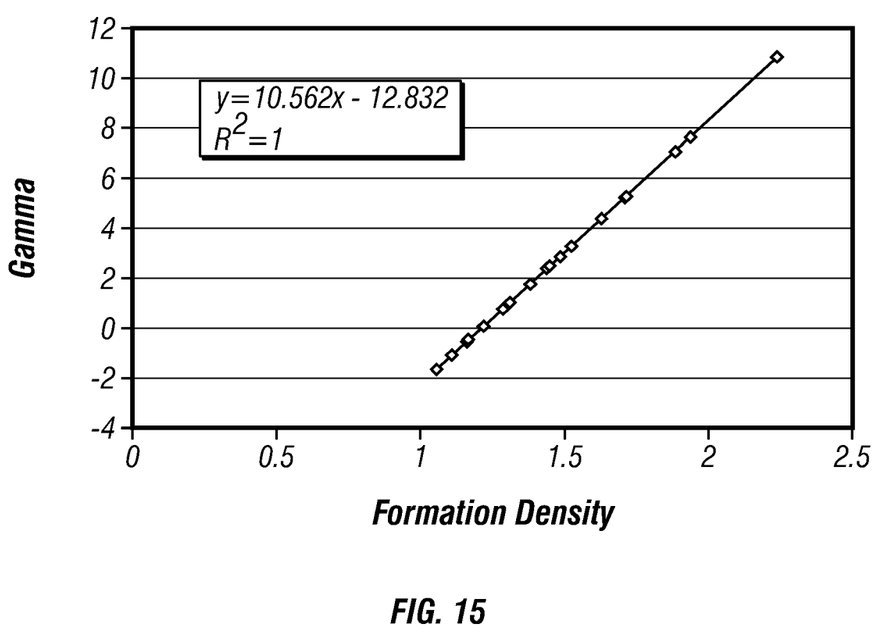
FIG. 15 shows the effective mud thickness parameter (formation sector) γ for the near detector as a function of the density ratio of the formation and the mud.
Figure 16:
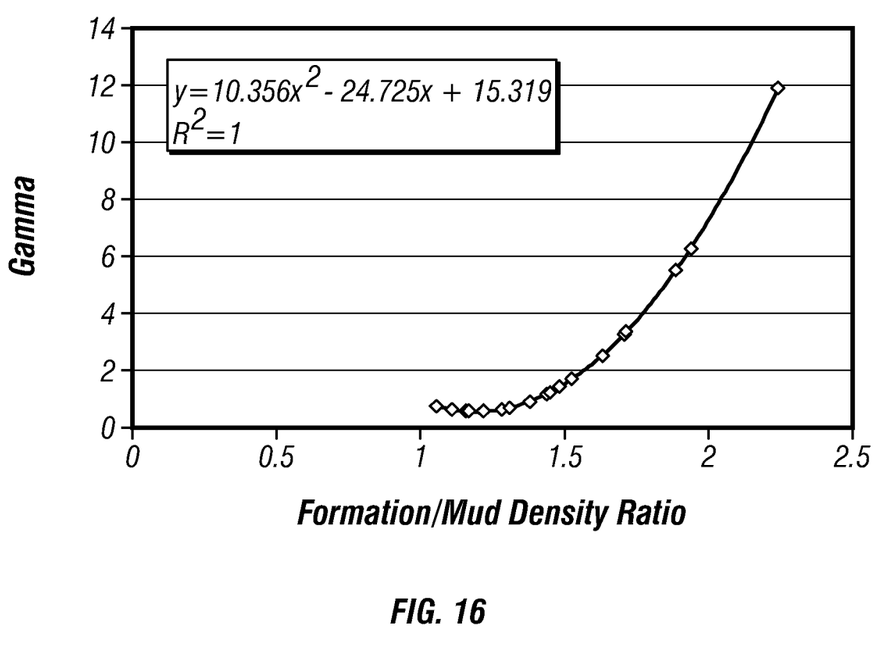
FIG. 16 shows the effective mud thickness parameter (formation sector) γ for the far detector as a function of the density ratio of the formation and the mud.

The partitioning parameter $\lambda$ (FIGS. 7 and 8 for the near and far detector respectively), the purpose of which is to apportion flux between the formation and mud sectors, has a sharp transition at the point where the formation density is equivalent to the mud density. This occurs at a formation/mud density ratio of approximately 1.28 due to the large photoelectric cross-section of the barite mud. For muds having elemental constituents with atomic numbers similar to those of the formation, the transition should be near the formation/mud density ratio of 1.0. Similar transitions are seen in the $\beta$ (FIG. 11), mud in-scattering parameter, and $\xi$ (FIG. 13), the effective mud thickness parameter, for the near detector FIGS. 9 and 10 showed that the parameter $\alpha$ is a linear function of formation density. The value of $\beta$ and $\xi$ for the far detector (FIGS. 12, 14) do not show the transition seen in the near detector. The value of $\gamma$ for the near and far detectors is adequately described as a linear function and a quadratic function respectively of the formation to mud density ratio (FIGS. 15-16).

Eqn. (1) provides the ability to determine a standoff. Using approximate values of formation and mud electron densities, the parameters $\lambda$, $\alpha$, $\beta$, $\gamma$ and $\xi$ may be calculated. $\mu$ and Io are determined from the two-point tool calibration (in magnesium and aluminum blocks. These values, upon substitution in eqn. (1), can be used to determine the standoff $t_m$. Optionally, using the standoff, an updated formation density may be determined using a spine and rib correction. This may be then used to get an updated estimate of the parameters $\lambda$, $\alpha$, $\beta$, $\gamma$ and $\xi$, and of the standoff. It should be noted that the method does not require making measurements at a specific orientation, such as that corresponding to a minimum standoff.

Alternatively, based on the results of FIGS. 7-16, eqn. (1) may be viewed as an equation in three unknowns, referred to as "density parameters" (mud density, formation density and standoff; $\rho$, $\rho_m$ and $t_m$). Making measurements at two source-receiver distances provides two measurements in three unknowns. Thus, given a value of one of the three unknowns, the other two may be determined. This is a non-linear inversion problem that is amenable to solution. In one embodiment of the disclosure, an acoustic caliper is used to make measurements of the standoff during rotation of the BHA. Density measurements are made concurrently with the standoff measurements. It is possible that due to washouts, at certain azimuths and/or depths, the acoustic caliper may be unreliable. Caliper measurements that are of good quality may be used in combination eqn. (1) to estimate the mud density and the formation density. The estimated mud density may then be used in conjunction with the estimated formation density (from the dual detector measurements) and eqn. (1) to estimate the standoff in portions of the borehole where the acoustic caliper is unreliable. This may involve interpolation and/or extrapolation in azimuth and in depth. Conceptually, this involves using the estimated mud density and an estimated formation density at a second location to estimate a standoff at the second location.

In yet another embodiment of the disclosure, the mud density is determined using good caliper measurements as above. It is then possible in portions of the borehole with good caliper measurements to estimate a formation density just from short-spaced detector using eqn. (1). This gives reliable density measurements with a higher resolution than previously possible (the use of dual-detector measurements necessarily leads to a loss of resolution).

In yet another embodiment of the disclosure, measurements are made using three detectors: a short-spaced detector, a long-spaced detector, and an extra long-spaced detector. This provides three measurements in three unknowns that are sufficient to solve eqn. (1) to get $\rho$, $\rho_m$ and $t_m$.

While the disclosure above has focused on an MWD implementation, this is not to be construed as a limitation. The method of the disclosure may also be added out using tools in a logging string conveyed on a wireline. The BHA and the logging string made collectively be referred to as a downhole assembly.

The processing of the data may be accomplished by a downhole processor. Implicit in the control and processing of the data is the use of a computer program implemented on a suitable machine readable medium that enables the processor to perform the control and processing. The results of the processing may be recorded on a suitable medium. The machine readable medium may include ROMs, EPROMs, EAROMs, Flash Memories and Optical disks. Implicit in the disclosure is the recording or processed results where appropriate on a suitable medium.

While the foregoing disclosure is directed to the specific embodiments of the disclosure, various modifications will be apparent to those skilled in the art. It is intended that all variations within the scope and spirit of the appended claims be embraced by the foregoing disclosure.

What is claimed is:

1. A method of evaluating an earth formation, the method comprising:
    irradiating the earth formation with a source of radiation on a tool within a borehole;
    making measurements at least two spaced apart detectors responsive to gamma rays resulting from the irradiating;
    defining a heuristic model that includes three density parameters: (I) a formation density, (II) a standoff of the tool, and (III) a density of a mud in the borehole, the model further comprising a first path length from the source of radiation to a first one of the at least two spaced apart detectors and a second path length from the source of radiation to a second one of the at least two spaced apart detectors;
    using the measurements and the heuristic model to estimate values of two of the three density parameters corresponding to a specific value of the third of the three density parameters; and
    recording the estimated values of the two of the three density parameters on a suitable medium.

2. The method of claim 1 wherein irradiating the earth formation further comprises using a gamma ray source.

3. The method of claim 1 wherein defining the heuristic model 2 further comprises fitting results of a Monte Carlo simulation to a model including the first path length, the second path length, a scattering parameter in the mud, a scattering parameter in the formation, and a partitioning parameter.

4. The method of claim 3 further comprising performing the Monte Carlo simulation for different values of: (i) formation density, (ii) mud weight, and (iii) standoff.

5. The method of claim 1 wherein using the heuristic model further comprises using an equation of the form:

$$I = \{e^{-\lambda\eta}e^{-\mu(2\rho_m t_m \gamma + \rho t)}\rho e^{\rho\alpha} + (1 - e^{-\lambda\eta})e^{-\mu(\xi\rho_m t_m + \rho mt)}\rho_m e^{\rho m\beta}\}I_0$$

where I=detector count rate,
    $I_0$=source strength,
    $\rho$=formation electron density,
    $\rho_m$=mud electron density,
    t=source–detector distance (cm),
    $t_m$=standoff (cm),
    $\mu$=mass attenuation coefficient (cm$^2$/g), and
    $\eta$=0.5 tm,
    $\lambda$ is a partitioning parameter allocating the measured signal to effects of the mud and the formation, $\alpha$ and $\beta$ are scattering parameters in the formation and the mud respectively, and $\xi$ and $\gamma$ are effective thickness parameters for the mud in the formation sector and the mud sector respectively.

6. The method of claim 5 further comprising determining a value of $\lambda$, $\alpha$, $\beta$, $\xi$ and $\gamma$ using a Monte Carlo simulation.

7. The method of claim 1 wherein the third parameter is a standoff of the tool measured at a first location using a caliper, the method further comprising: using the estimated mud density and an estimated formation density at a second location to estimate a standoff at the second location.

8. The method of claim 7 further comprising producing a log of tool standoff at other locations without using a caliper measurement.

9. The method of claim 1 wherein the third parameter is a standoff of the tool measured at one location using a caliper, the method further comprising: using the estimated mud density, a caliper measurement at another location, and a measurement at one of the two detectors to estimate a formation density at the other location.

10. The method of claim 1 wherein the at least two detectors comprise three detectors, the method further comprising determining all the three density parameters simultaneously.

11. An apparatus configured to evaluate an earth formation, the apparatus comprising:
a source of radiation on a tool configured to irradiate the earth formation from within a borehole;
at least two spaced apart detectors configured to provide measurements indicative of gamma rays resulting from the irradiating; and
a processor configured to:
define a heuristic model that includes three density parameters: (I) a formation density: (II) a standoff of the tool, and (III) a density of a mud in the borehole, the model further comprising a first path length from the source of radiation to one of the at least two spaced apart detectors and a second path length from the source of radiation to a second one of the at least two spaced apart detectors;
use the measurements and the heuristic model to estimate values of two of the three density parameters corresponding to a specific value of the third of the three density parameters; and
record the estimated values of the two of the three density parameters on a suitable medium.

12. The apparatus of claim 11 wherein the radiation source further comprises a gamma ray source.

13. The apparatus of claim 11 wherein the processor is configured to define the heuristic model by further fitting results of a Monte Carlo simulation to a model including the first path length, the second path length, a scattering parameter in the mud, a scattering parameter in the formation, and a partitioning parameter.

14. The apparatus of claim 13 wherein the processor is further configured to perform the Monte Carlo simulation for different values of: (i) formation density, (ii) mud weight, and (iii) standoff.

15. The apparatus of claim 11 wherein the processor is further configured to use the heuristic model by using an equation of the form:

$$I = \{e^{-\lambda\eta}e^{-\mu(2\rho_m t_m \gamma + \rho t)}\rho e^{\rho\alpha} + (1 - e^{-\lambda\eta})e^{-\mu(\xi\rho_m t_m + \rho_m t)}\rho_m e^{\rho_m \beta}\}I_0$$

where I=detector count rate,
$I_0$=source strength,
$\rho$=formation electron density,
$\rho_m$=mud electron density,
t=source–detector distance (cm),
$t_m$=standoff (cm),
$\mu$=mass attenuation coefficient (cm²/g), and
$\eta$=0.5 tm,
$\lambda$ is a partitioning parameter allocating the measured signal to effects of the mud and the formation, $\alpha$ and $\beta$ are scattering parameters in the formation and the mud respectively, and $\xi$ and $\gamma$ are effective thickness parameters for the mud in the formation sector and the mud sector respectively.

16. The apparatus of claim 15 wherein the processor is further configured to determine a value of $\lambda$, $\alpha$, $\beta$, $\xi$ and $\gamma$ using a Monte Carlo simulation.

17. The apparatus of claim 11 wherein the third parameter is a standoff of the tool measured at one location using a caliper, and the processor is further configured to use the estimated mud density and an estimated formation density at another location to estimate a standoff at the other location.

18. The apparatus of claim 17 wherein the processor is further configured to produce a log of tool standoff at other locations without using a caliper measurement.

19. The apparatus of claim 11 wherein the third parameter is a standoff of the tool measured at one location using a caliper, and the processor is further configured to use the estimated mud density, a caliper measurement at another location, and a measurement at one of the two detectors to estimate a density at the other location.

20. The apparatus of claim 11 wherein the at least two detectors comprise three detectors, and the processor is further configured to determine all the three density parameters simultaneously.

21. The apparatus of claim 11 wherein the tool is part of one of: (i) a logging string conveyed on a wireline, and (ii) a bottomhole assembly conveyed on a drilling tubular.

22. A computer readable medium accessible to a processor, the computer-readable medium including instructions which enable the processor to:
use measurements provided by at least two spaced apart detectors on a tool in a borehole responsive to gamma rays resulting from irradiating by a source of radiation on the tool with
a heuristic model that includes three density parameters: (I) a formation density, (II) a standoff of the tool, and (III) a density of a mud in the borehole, a first path length from the source of radiation to one of the at least two spaced apart detectors and a second path length from the source of radiation to a second one of the at least two spaced apart detectors to estimate;
values of two of the three density parameters corresponding to a specific value of the third of the three density parameters; and
record the estimated values of the two of the three density parameters on a suitable medium.

23. The computer-readable medium of claim 22 further comprising at least one of (i) a ROM, (ii) an EAROM, (iii) an EPROM, (iv) an EEPROM, (v) a flash memory, and (vi) an optical disk.

* * * * *

UNITED STATES PATENT AND TRADEMARK OFFICE
CERTIFICATE OF CORRECTION

PATENT NO. : 7,596,452 B2
APPLICATION NO. : 11/770209
DATED : September 29, 2009
INVENTOR(S) : William Madigan et al.

It is certified that error appears in the above-identified patent and that said Letters Patent is hereby corrected as shown below:

Column 10, claim 3, line 37, delete the number "2"; and

Column 12, claim 22, line 50, delete the ";".

Signed and Sealed this

Third Day of November, 2009

David J. Kappos
*Director of the United States Patent and Trademark Office*